(12) United States Patent
Lloyd et al.

(10) Patent No.: US 8,985,408 B2
(45) Date of Patent: Mar. 24, 2015

(54) GARMENT HANGING ACCESSORY

(76) Inventors: Nicole Lloyd, Costa Mesa, CA (US);
Kim Lloyd, Fort Lauderdale, FL (US)

(*) Notice: Subject to any disclaimer, the term of this patent is extended or adjusted under 35 U.S.C. 154(b) by 512 days.

(21) Appl. No.: 13/306,239

(22) Filed: Nov. 29, 2011

(65) Prior Publication Data

US 2013/0133160 A1  May 30, 2013

(51) Int. Cl.
*A47G 25/48* (2006.01)
*F16B 2/20* (2006.01)
*A44B 11/06* (2006.01)
*F16B 2/10* (2006.01)

(52) U.S. Cl.
CPC .............. *A47G 25/486* (2013.01); *A47G 25/48* (2013.01); *A47G 25/483* (2013.01); *F16B 2/20* (2013.01); *F16B 2/10* (2013.01); *Y10S 223/02* (2013.01)
USPC ............ 223/91; 223/93; 223/96; 223/DIG. 2; 24/3.13; 24/265 EC; 24/302; 248/316.7

(58) Field of Classification Search
CPC ..... A47G 25/02; A47G 25/48; A47G 25/483; A47G 2025/48; A47G 2025/483; F16B 2/10
USPC ........... 24/3.11, 3.13, 507, 501, 302, 265 EC; 223/91, 93, 96, DIG. 2; 248/316.7
See application file for complete search history.

(56) References Cited

U.S. PATENT DOCUMENTS

| | | | | |
|---|---|---|---|---|
| 356,127 A | * | 1/1887 | Hoyt | 24/501 |
| 550,228 A | * | 11/1895 | McConnell | 223/96 |
| 737,335 A | * | 8/1903 | Burrell | 223/96 |
| D82,948 S | * | 12/1930 | Livingston | D6/318 |
| 2,209,697 A | * | 7/1940 | Kislingbury et al. | 24/507 |
| 2,475,436 A | * | 7/1949 | Roark | 24/501 |
| 2,748,437 A | * | 6/1956 | Dold | 24/501 |
| 2,849,168 A | * | 8/1958 | Boyer | 223/91 |
| 6,023,818 A | * | 2/2000 | Shang | 24/501 |
| 6,842,951 B1 | * | 1/2005 | Barre et al. | 24/501 |
| 8,011,069 B1 | * | 9/2011 | Klein | 24/3.11 |
| 8,272,158 B1 | * | 9/2012 | Ball | 43/8 |
| 2013/0313292 A1 | * | 11/2013 | Alley et al. | 223/85 |

* cited by examiner

*Primary Examiner* — Robert J Sandy
(74) *Attorney, Agent, or Firm* — Melvin K. Silverman

(57) ABSTRACT

A garment-hanging accessory includes a strip of material having a first end and a second end; and a clip having an engaging end biased into a normally closed position and openable upon application of pressure upon opposing levers at an opposite end of the clip, the levers connected by a spring secured about a fulcrum point between the levers, each end of the strip of material secured to a respective opposite side of each of the opposing levers, opposite ends of each lever, not secured to either of the ends of the strip of material, co-acting to define a garment engaging end when the clip is in its normally closed position. The unsecured portion of the strip opposite the clip is suspended upon a primary garment hanger.

8 Claims, 5 Drawing Sheets

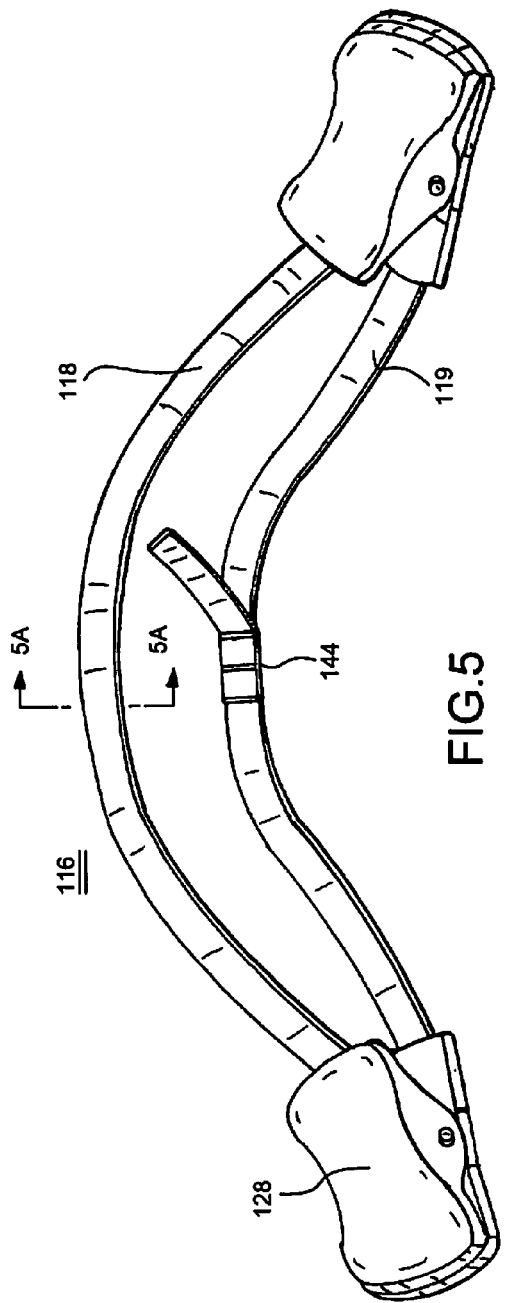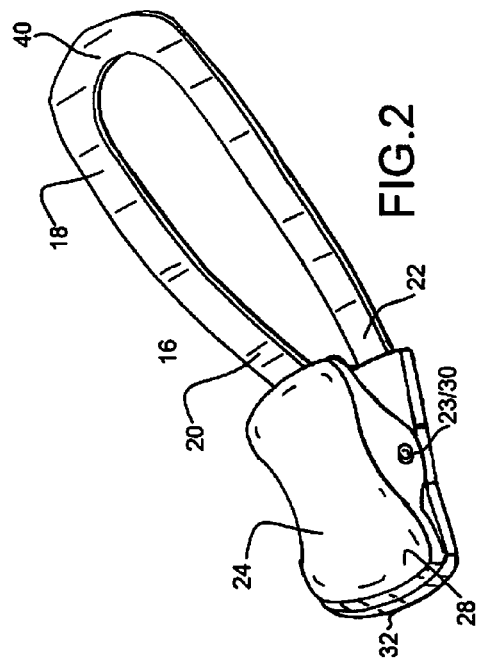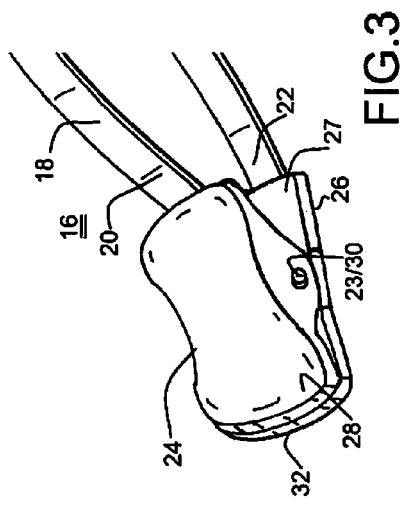

GARMENT HANGING ACCESSORY

AREA OF INVENTION

The present invention relates to garment hanging accessories and, more particularly, to a garment hanging system adapted to hang upon a primary clothing hanger.

BACKGROUND OF THE INVENTION

As is well-known to women who wear various types of blouses, tube tops dresses, skirts, undergarments and swimwear, such garments often are provided with so-called hanging loops, the purpose of which is to facilitate the hanging of such garments in one's wardrobe in a manner which is more visible, less wrinkled and therefore functional than simply folding the same and keeping them in a credenza or chest of drawers. There is a wide range of articles of clothing which are today provided with such hanging loops since the design of the original garment does not allow the item to hang correctly on a typical hanger whether it is a blouse, tube top, dress or skirt. Because of the range of articles of clothing which are today provided with such hanging loops, one must either purchase special-purpose types of hangers to use therewith or must attempt to appropriately wrap one or more of the loops of the garment about an otherwise conventional shirt or blouse-type hanger which may or may not itself be provided with hooks, protrusion or regions proportioned to accommodate the loops of such garments.

Regardless of the manner in which one chooses to suspend or display such garments in one's closet or wardrobe, a remaining and often bothersome issue for many women is that the hanging loops of a given garment, whether it be a blouse, tube top, dress, skirt, lingerie piece or swimsuit, have a potential to work their way outside of the garment where they are typically affixed. When this occurs, the hanging loop may become visible to the public which, to most women, is unwanted, embarrassing, bothersome, and can be skin irritating depending on the material of the loop. The present invention is therefore directed to a group of garment hanging accessories which permit one using the same to simply remove or cut-off the garment straps that have been provided and, thereafter, for purposes of hanging, arrangement and organization within one's wardrobe or closet, to employ the present inventive garment-hanging accessory in conjunction with an otherwise conventional shirt, blouse, tube top, or other general purpose type of hanger.

The invention is equally applicable to garments not originally provided with such loops as well as for men's slacks to avoid creases once folded over the bottom of a typical hanger.

The present invention therefore responds to the long-felt need in the art for a garment-hanging accessory of the types set forth herein.

SUMMARY OF THE INVENTION

A garment-hanging accessory includes a strip of material having a first end and a second end; and a clip having an engaging end biased into a normally closed position and openable upon application of pressure upon opposing levers at an opposite end of said clip, said levers connected by a spring secured about a fulcrum point between said levers, each end of said strip of material secured to a respective opposite side of each of said opposing levers, opposite ends of each lever, not secured to either of said ends of said strip of material, co-acting to define a garment engaging end when said clip is in said normally closed position. The unsecured portion of the strip opposite the clip is suspended upon a primary garment hanger.

It is an object of the present invention to provide a garment-hanging accessory which enables a user to dispense with the need for use of otherwise conventional garment hanging loops.

It is another object to provide an accessory of the above type which permits the user thereof to remove conventional garment hanging loop from blouses, tube tops, dresses, skirts, swimwear, lingerie and the like and, in lieu hereof, employ a garment-hanging accessory of the type set forth herein, such that the article of clothing may be readily suspended upon an otherwise conventional shirt or blouse-type of hanger.

It is a further object of the invention, to provide a garment-hanging accessory which provides a means by which multiple garments may be suspended from a single hanger to provide for better coordination and choice of suitable outfits of interests for men and women.

It is a still further object to provide an accessory of the above type without regard to whether the article of clothing was originally provided with hanging loops.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 2 is a perspective view of a first embodiment of the present inventive garment-hanging accessory.

FIG. 3 is an enlarged view of a left hand portion of FIG. 2.

FIG. 5 is a representational view of a second embodiment of the invention.

DETAILED DESCRIPTION OF THE INVENTION

Figure 1:
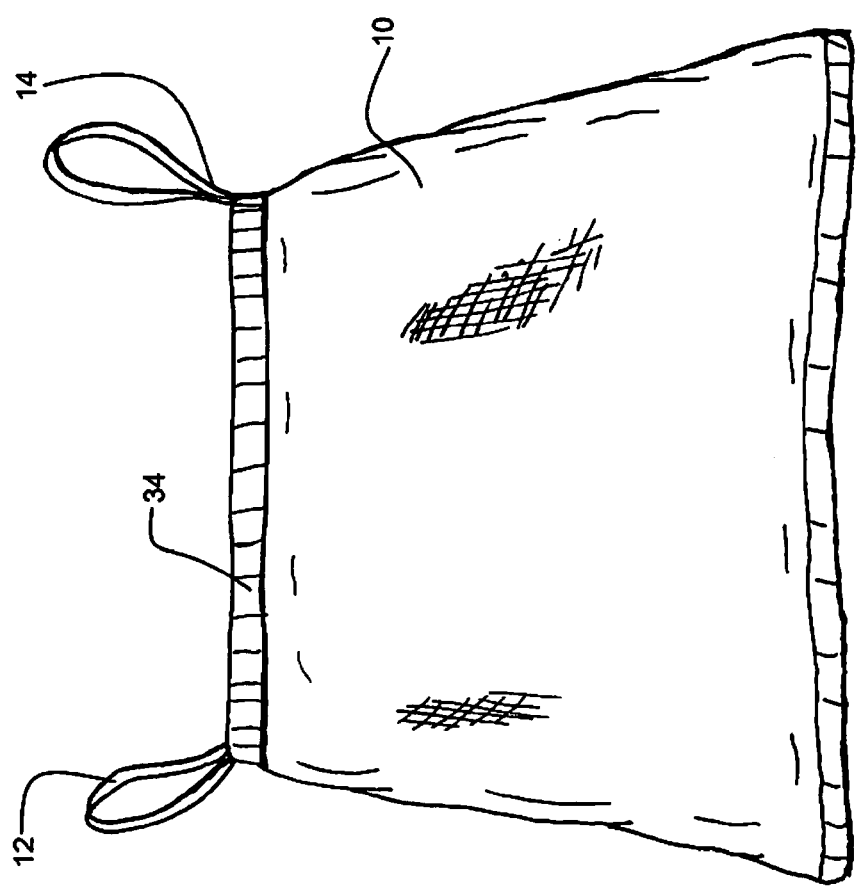
FIG. 1 is a representational view of one type of a garment provided with conventional garment-hanging loops. Various other garments are similarly provided with conventional hanging loops.

With reference to FIG. 1, there is shown a typical prior art female garment as, for example, a skirt 10, or under skirt, provided with loops 12 which are typically connected at the inside of waistlines 34 of the skirt at area 14. As above noted, loops of this type are common in many types of women's garments for purposes of facilitating the hanging thereof upon special-purpose hangers that may be purchased for such purpose. Also, loops 12 may be positioned differently on different types of clothing, including tube tops. In most cases, the loops of such garments, during the wearing thereof, possesses a tendency to pull-out from beneath the waist line where they are typically positioned during the normal use and thereupon often become visible, causing potential embarrassment and annoyance to the user.

In the practice of the present invention, such loops 12 are cut from the garment 10 after the purchase thereof and, in lieu of such loops, there is provided a structure 16 of the types shown in FIGS. 2 and 3 in which is shown a first embodiment of the present invention. It is noted that the present invention is equally of value in the hanging of garments, such as underwear, not originally provided with any loops.

Figure 6:
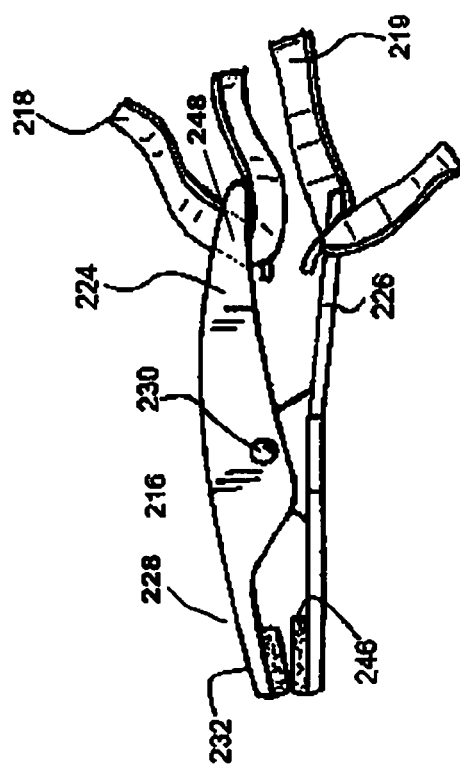
FIG. 6 is a view of a third embodiment of the invention in which the strap portion thereof is suspended by passage thereof through a slot or opening within the levers of the clip of the present invention.

The inventive garment hanging accessory includes a strip of material 18 having ends 20 and 22 thereof which are secured to respectively opposing surfaces of levers 24 and 26 of a clip 28 which are biased into a normally closed position by a spring 30, an end of which is shown in FIGS. 2 and 3. The preferred manner of connection of ends 20 and 22 to levers 24 and 26 is shown in FIG. 6 and described in connection with the description of FIG. 6 below.

Spring 30 may for example comprise a coil spring such that engagement ends 32 of clip 28 is normally closed, in the manner shown in FIGS. 2 and 3 and is openable upon application of pressure upon said opposing levers 24 and 26. A representative of said coil spring may be seen in the teaching of U.S. Pat. No. 2,748,437 to Dold. In effect, spring 30 biases levers 24 and 26 about a fulcrum point 23 of the structure and co-acts with said levers and garment engaging ends 32 of the clip to secure a garment of interest in, for example, the manner shown in FIG. 4 opposite to clip end of strap 18 is hanging end 40 of the accessory. Therefrom, it may be appreciated that a garment such as skirt 10 or nearly any other female garment may be readily secured and suspended through the use of two of the structures shown in FIG. 2, in which engagement ends 32 of the clip 28 are secured to garment 10A at or near waistline 34 of the garment and from hanging end 40.

Figure 4:
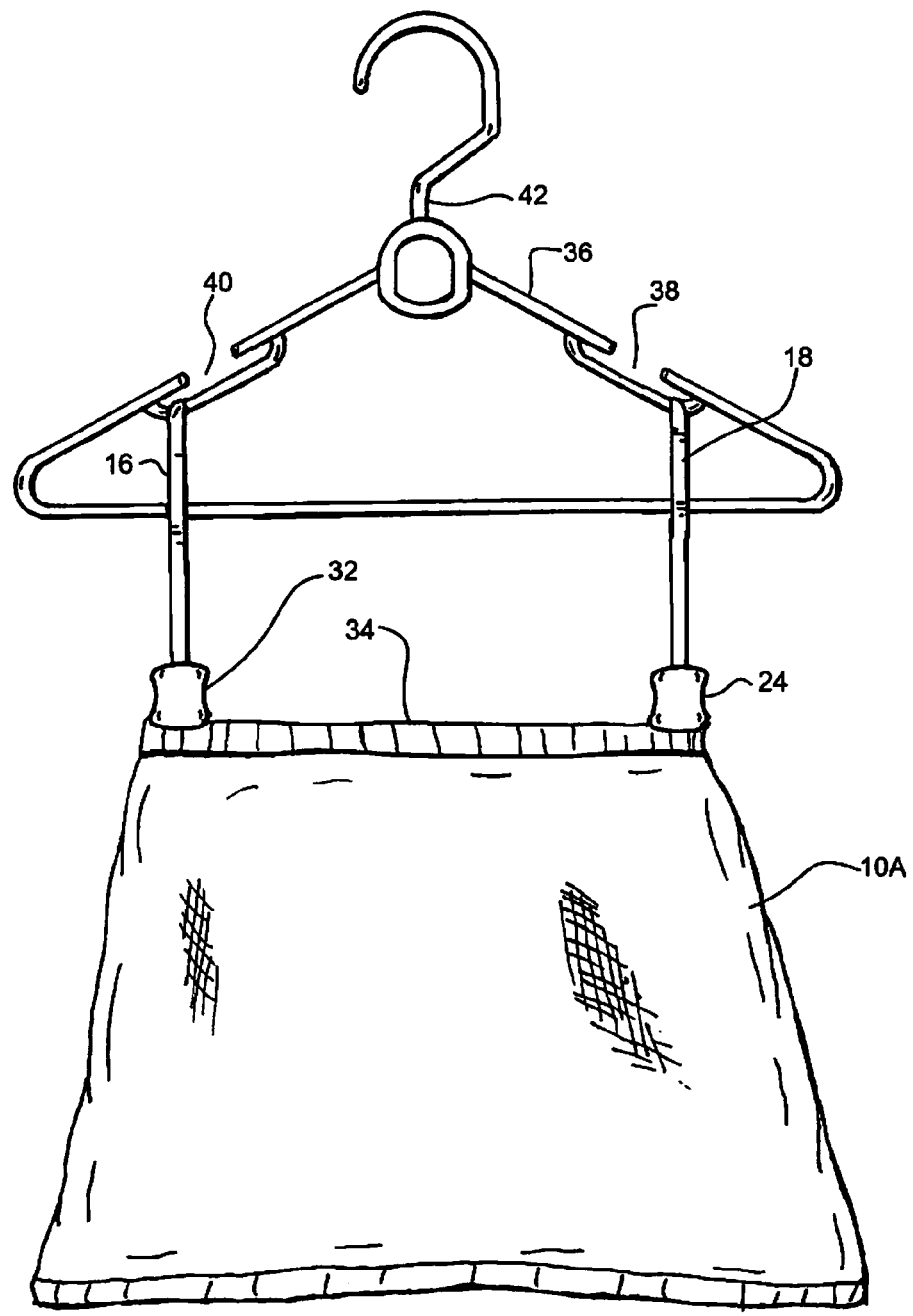
FIG. 4 is an operational view of the present invention showing the use of the embodiment of FIG. 2 used in conjunction with a conventional shirt or blouse-type hanger in which the clip elements thereof are attached to the waistline of the suspended garment.
Figure 7:
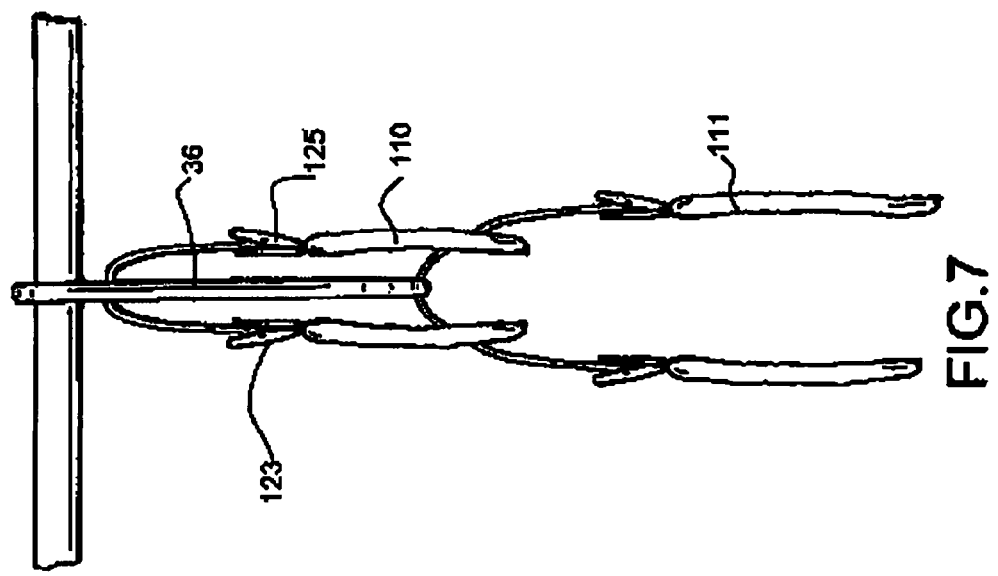
FIG. 7 is a side elevational view of a shirt or blouse hanger upon which two pairs of accessories of the embodiment of FIG. 5 have been suspended upon the hanger, illustrating the manner in which four articles of clothing may be suspended upon a typical shirt or blouse hanger.

FIG. 4 therefore shows a garment hanger 36, such as a shirt or blouse hanger, this inclusive of a sub-hanger area 38 upon which ends 40 of straps 18 are then hung. However, it is to be understood that straps 18 may be hung upon the is hanger from area 42 of the hanger or any other area as well, and on hangers of other configurations, from any part of any hanger that the loop of strap 18 may be placed in or over, without unbalancing the hanger. This enables pants to be hung on shirt-type or other hangers. It is also to be understood that multiple pairs of the present garment hanging accessory 16 may be hung about different parts of a given hanger 36, as is discussed below relative to FIG. 7.

In FIG. 5 is shown a further embodiment 116 of the present invention in which clips 128 and 129 are provided at each end of a strip 118 and in which a bra length adjuster element 144 is also employed. It is to be understood that adjuster element 144 would typically be used on both sides of strap 118 and, additionally, may be readily employed within strip 18 shown in FIGS. 2 and 3. The benefit of the provision of clips 128/129 at each end of strips 118 and 119 is that it enables the hanging of a large number of smaller garments 110 and 111 in the manner shown in FIG. 7.

Figure 5A:
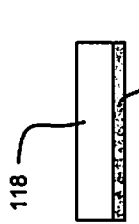
FIG. 5A is a cross-sectional view taken along Line 5A-5*a* of FIG. 5.

Shown in FIG. 5A is a cross-section taken along Line 5A-5A of FIG. 5, indicating that an anti-strip surface 121 may be provided to the underside of strip 118 and to any strip used in the present invention, particularly at the area of contact with a primary hanger 36. See FIG. 4.

With reference to the side elevational view of FIG. 6, there is shown a further embodiment 216 of a clip 228 which may be advantageously employed in the practice of the invention. Said clip, like that of earlier embodiments may be provided with padding 246 upon the inner surfaces of forward end 232, or that of the forward ends of any of the above-described embodiments of clip 23 or 123. Further, and particularly to the embodiment of FIG. 6, lever 224 and 226 are shown to include openings 248 within levers 224 and 226 of clip 228 such that strap 218 may pass through opening 248, this as opposed to the securement of end 27 (see FIG. 3) of strip 18 to each inner surface of levers 24 and 26 of clip 28. Where this embodiment is employed, a loop may be formed of strip 218 after ends thereof have passed through opening 248 of levers 224 and 226. Alternatively, opposite ends of strips 218 and 219 may then be fastened together to form the embodiment shown in FIG. 2 or provided with a clip similar to clip 228, in the manner shown in the embodiment of FIG. 5.

Figure 8:
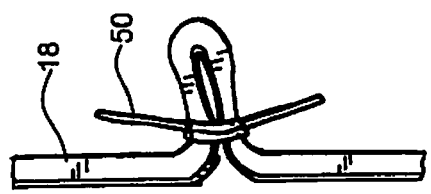
FIG. 8 is a view, further to that of FIG. 5, showing the manner in which a zip-tie may be employed, in lieu of a bra strap adjuster, to reduce the length of a strap used in the present system.

In FIG. 8 is shown the use of a zip tie 50 in applications where one wishes to shorten or adjust the length of strip 18, 118, or 218. As such, tie 50 may be viewed as an equivalent of bra strap adjuster 144 that may as such be employed in any embodiment of the present invention.

Figure 9:
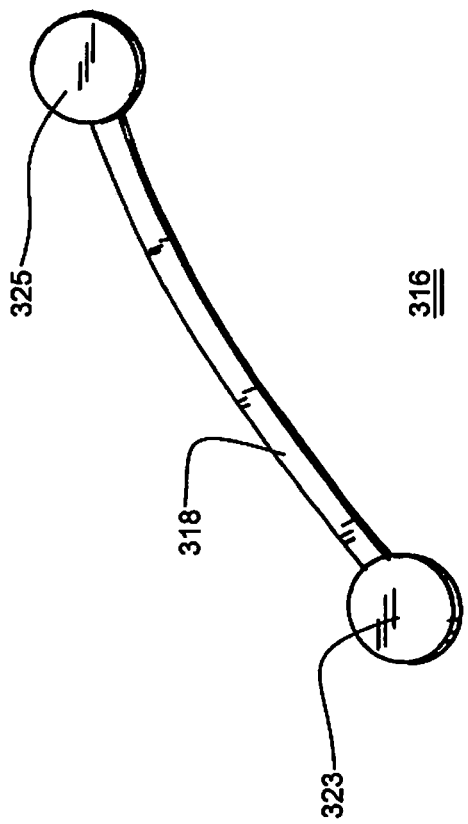
FIG. 9 is a perspective view of a fourth embodiment of the invention in which magnets of opposing polarity may be used in lieu of clips for purposes of securement to an article of clothing to be suspended, in any of the preceding embodiments.

Shown in FIG. 9 is a further embodiment 316 of the invention in which magnets 323 and 325 of opposite polarity are used in combination in lieu of the clips 28 shown in the embodiment of FIG. 2 with strap 318 shown therebetween. It is to be appreciated that magnets 323 and 325 may be employed in lieu of clips in any of the embodiments described above.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

We claim:

1. A garment-hanging system, comprising:
   (a) a substantially isosceles triangular garment hanger in which an apex of said hanger includes an upwardly projecting hook for selectably placing the hanger upon a horizontal hanging pole, in which left and right angulated sides of said hanger each include a sub-hanger;
   (b) two strips of material each having a first end and a second end, said ends of each strip joined to form an endless loop, each strip of sufficient length to permit a middle of each strip to hang upon each respective sub-hanger, one-half of said length of each strip of sufficient dimension to extend below a base of said triangular garment hanger; and
   (c) clips each having an engaging end biased into a normally closed position and openable upon application of pressure upon opposing levers of each clip, said levers connected by a spring secured about a fulcrum point between said levers, each strip of material secured within one respective opposite end of each of said opposing levers, said clips co-acting to define garment engaging means when said clips are in said normally closed position.

2. The garment-hanging system as recited in claim 1, in which said spring comprises a coil spring.

3. The garment-hanging system as recited in claim 1, in which said strip comprises an expansible material.

4. The garment-hanging system as recited in claim 1, in which each inner side of said garment-engaging end includes a padded surface.

5. The garmenting-hanging system as recited in claim 1, in which said strip of material includes at least one length-adjusting element.

6. The garment-hanging system as recited in claim 5, in which said length adjusting element comprises a bra-strap length adjuster.

7. The garment-hanging system as recited in claim 5, in which said length adjusting element comprises a zip tie.

8. The garment-hanging system as recited in claim 1, in which a portion of a side of said strip of material in contact with a primary garment-hanging accessory is provided with an anti-slip surface.

\* \* \* \* \*